United States Patent [19]

Graf et al.

[11] Patent Number: 4,875,183

[45] Date of Patent: Oct. 17, 1989

[54] NEURAL NETWORKS

[75] Inventors: Hans P. Graf, North Middletown; Richard E. Howard, Highland Park, both of N.J.

[73] Assignee: American Telephone and Telegraph Company, AT&T Bell Laboratories, Murray Hill, N.J.

[21] Appl. No.: 122,870

[22] Filed: Nov. 19, 1987

[51] Int. Cl.$^4$ ................................................ G06G 7/02
[52] U.S. Cl. ...................................... 364/807; 307/201
[58] Field of Search .................... 307/201; 340/825.79, 340/825.8, 825.83, 825.89; 364/513, 602, 807

[56] References Cited

U.S. PATENT DOCUMENTS

| | | | |
|---|---|---|---|
| 3,976,845 | 8/1976 | Ashley | 340/825.89 |
| 4,348,670 | 9/1982 | DeShon | 340/825.89 X |
| 4,719,591 | 1/1988 | Hopfield et al. | 364/807 |
| 4,731,747 | 3/1988 | Denker | 364/807 |

OTHER PUBLICATIONS

J. J. Hopfield, "Neural Networks and Physical Systems with Emergent Collective Computational Abilities", *Proceedings of the National Academy of Science,* vol. 79, Apr. 1982, pp. 2554–2558.
J. J. Hopfield, "Neurons with Graded Response Have Collective Computational Properties Like Those of Two-State Neurons", *Proceedings of the National Academy of Science,* vol. 81, May 1984, pp. 3088–3092.
M. A. Sivilotti, M. R. Emerling, and C. A. Mead, "VLSI Architectures for Implementation of Neural Networks", AIP Conference Proceedings 151, Snowbird, Utah, 1986, pp. 408–413.
N. H. E. Weste and K. Eshraghian, *Principles of CMOS VLSI Design, A Systems Perspective,* Addison-Wesley Publishing Company, 1985, pp. 53–55.
S. M. Sze, *VLSI Technology,* McGraw-Hill Book Company, 1983.
J. S. Denker, "Neural Network Models of Learning and Adaptation", Physica, vol. 22D, 1986, pp. 216–232.
W. Hubbard, D. Schwartz, J. Denker, H. P. Graf, R. Howard, L. Jackel, B. Straughn, and D. Tennant, "Electronic Neural Networks", *AIP Conference Proceedings 151,* Snowbird, Utah, 1986, pp. 227–234.
H. P. Graf and P. deVegvar, "A CMOS Implementation of a Neural Network Model", *The Proceedings of the Stanford Conference on Advanced Research on VLSI,* ed. P. Losleben, M.I.T. Press, 1987, pp. 351–367.

*Primary Examiner*—Steven Mottola
*Attorney, Agent, or Firm*—Bruce S. Schneider

[57] ABSTRACT

The operation of neural networks begins with the initialization of the system with the information to be processed. Presently, this initialization is performed by pinning the system with rather large analog or digital signals representing this information. The problems associated with the high power required for such initialization are eliminated and accuracy is maintained by utilizing a specific set of input points and appropriately positioned switches. In particular, a switch corresponding to each amplifier is introduced, and the initializing data is introduced between the amplifier and this switch.

9 Claims, 2 Drawing Sheets

NEURAL NETWORKS

BACKGROUND OF THE INVENTION

1. Technical Field

This invention relates to data processing and, in particular, data processing involving parallel information architectures.

2. Art Background

Recently, the neural network design of devices suitable for information processing has been reported. (See *Procceedings of the National Academy of Science, USA*, Vol. 79, J. J. Hopfield, page 2554 (1982), and *Proceedings of the National Academy of Science, USA*, Vol. 81, J. J. Hopfield, page 3088 (1984), for a general description of this design.) Basically, such a network includes (1) a matrix having an interconnection element (e.g., a resistor with impedance between zero and infinite), at each intersection where (a) the interconnection element affects in a characteristic manner the signal transferred between the interconnected row and column and (b) at least one interconnection element allows the passage of at least $1 \times 10^{-12}$ amp in each active row and at least one element allows the passage of such current in each active column and (2) active element(s) (e.g., amplifying devices that have gain greater than one) interacting with the matrix. The network is tailored to perform a desired processing function by appropriately choosing the impedance magnitude for each matrix intersection.

The data to be processed is introduced at input points. As the name parallel processing implies, all or a substantial portion of the data is introduced before processing is instituted. This process of introducing the information before processing is called initialization. To avoid errors the system should begin interaction with all this data essentially simultaneously. (In this context, simultaneous interaction means all the introduced data is present within a time equal to the settling time of the active element. Settling time is the larger of (1) the product of the output impedance of the active element multiplied by the capacitance of the output conductor and (2) the delay between a change in input to the active element and the completion of 90 percent of the corresponding change in the output.)

Schemes for initialization have been quite limited. Generally, it is proposed that the data in the form of an analog or digital signal be introduced at the inputs with the voltage—a voltage representing one component of the input vector—being introduced at each input point. Premature processing before all data is entered is prevented by employing high input signal power levels, e.g., levels above the product of (1) the square of the maximum output current of the associated amplifier times and (2) the effective resistance of the node of the matrix to which it is connected. This high power saturates the amplifiers and precludes the onset of processing. To initiate processing, all the input signals are terminated essentially simultaneously.

There is, however, a significant drawback with this saturation scheme. The high powers required to induce saturation produce a large thermal stress on the system. Since heat removal is generally an inefficient procedure, the number of input points and thus the amount of data that can be processed is correspondingly limited.

Initialization by switching off all interconnections has been reported (M. A. Sivilotti et al, *Proceedings of the Conference of Neural Networks for Computing*, J. S. Denker, ed., Snowbird, Utah, 1986, pp. 408-413). This requires a very large number of switches ($N^2$) and is therefore not suitable for large circuits.

SUMMARY OF THE INVENTION

Initialization which does not limit data input is accomplished by employing a series of switches in conjunctionwith appropriate introduction points for data. In particular, a switch is positioned in each column of the matrix. (The use of the terms columns and rows for the various portions of the matrix, e.g., a column being connected to input and rows to outputs, is employed merely to differentiate the two sets of electrodes and such denomination could be reversed). Data is introduced for each processing line at a point between the switch and the input of the corresponding amplifier. This criterion is satisfied, for example, by placing the switch in a column line or a row line and impressing the input on the side of the switch closest to the input of the amplifier. That is, as shown in FIG. 1, a switch, 20, is introduced into each column and the data for that column is introduced at point 24 through switch 26. To institute processing, data is impressed on each line charging capacitors, 28, switches 26 are opened, and the switches 20 are simultaneously closed, e.g., closed within the settling time of the fastest amplifier.

Network configurations are possible where a number of column and row connections are not present, i.e., are of infinite resistance. The same criteria are applicable for these configurations. For such situations it is acceptable in some applications that not all the active elements be initialized to obtain reliable results. Nevertheless, initialization of a significant number of active elements is still required.

Two exemplary embodiments are shown in FIGS. 2 and 3. As shown in FIG. 2, switches 30 are present in each column or row and information is introduced on the side of the switch not connected to the amplifier output. In another embodiment, FIG. 3, a switch is present in each column and information is introduced between the switch and the input of the active element.

DETAILED DESCRIPTION

The design and fabrication of neural network circuits has been described in several publications. For example, appropriate design and fabrication techniques are described in Wests and Eshraghian, *Principles of CMOS VLSI Design, A Systems Perspective*, Addision Wesley Publishing Company (1985) and S. M. Sze (ed.), *VLSI Technology*, McGraw-Hill Book Company (1983). (See also, U.S. Application 796,085 filed Jan. 3, 1986, which is hereby incorporated by reference). Within the context of utilizing these fabrication sequences, switches are inserted in each column (or row) of the matrix by conventional techniques. For example, switches are produced by using discrete CMOS analog switches or integrated transistors. A switch, for this purpose, is a circuit element which when opened prevents a significant current developing at a node. A significant current is one such that if all switches connected to the node are open, the effect on the circuit should be less than if one switch is closed. However, the impedance of the closed switch should be sufficiently small so that the response time of the network is not undesirably affected. The expedient utilized to fabricate the switch and the configuration of the switch is not critical provided these criteria are met. Exemplary of suitable switches are CMOS T-gate switches. Fabrication of such switches is disclosed in Weste and Eshraghian, supra.

A means must also be provided for introducing data into each column of the matrix at an appropriate location. The input signal for each column should be introduced between the corresponding switch and amplifier input. Two embodiments are shown respectively in FIGS. 2 and 3. In FIG. 3 switches, 20 and 26, are positioned before amplifiers, 32. As previously discussed, switch, 26, closed and the signal voltage is applied to the input of the amplifier, 32, and storage capacitor, 31.

When switch, 26, is opened, the voltage on amplifiers, 32, remains substantially fixed because of the charge stored on capacitor, 31. This result occurs because the active element input impedance times the capacitor, 31, is at least twice as long as the settling time. The presence of a suitable capacitor is generally satisfied by the inherent capacitance of the active element for MOS circuits. However, if this criterion is not satisfied, it is advantageous to increase the capacitance rather than relying on the inherent capacitance of the active element. After this initialization is accomplished, switches, 26, are opened and the network is started by closing switches, 20. (Capacitor, 31, is present in one embodiment just from the input capacitance of amplifier, 32, and the associated parasitic capacitances).

Figure 1:
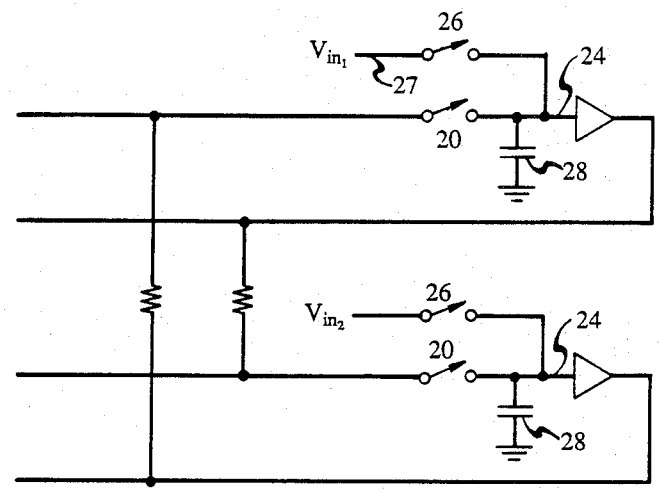
FIG. 1 is illustrative of one embodiment of the invention.
Figure 2:
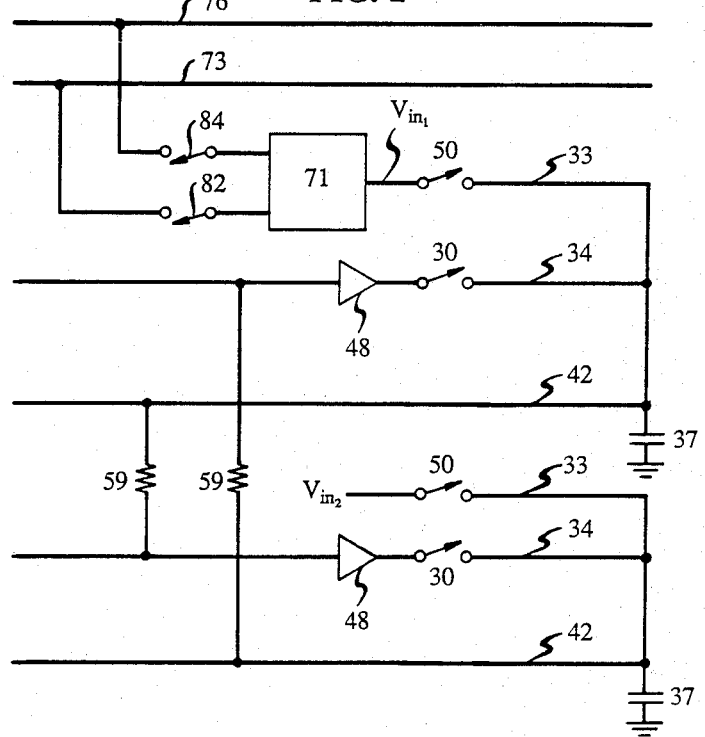
FIG. 2 is illustrative of a second embodiment of the invention.
Figure 3:
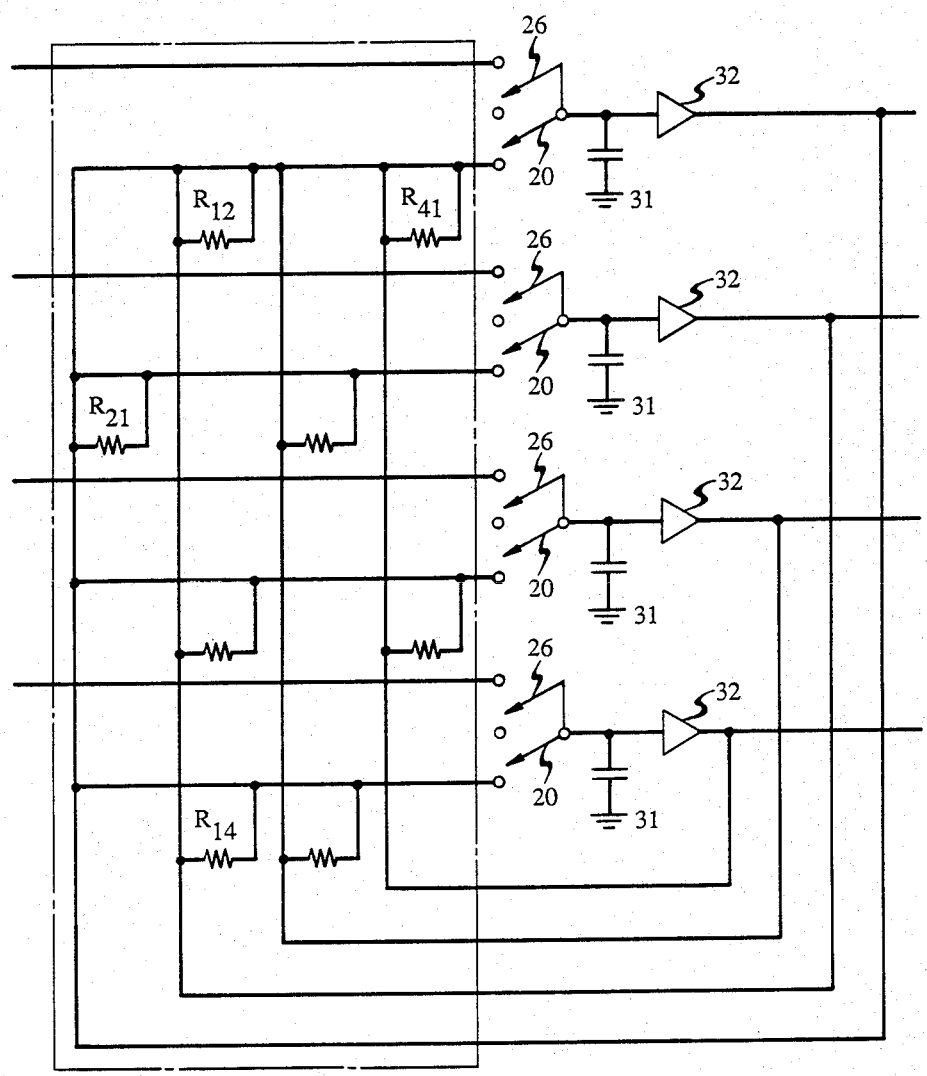
FIG. 3 is illustrative of a third embodiment of the invention.

In another embodiment shown in FIG. 2, switches, 30, are inserted in the rows at position, 34. Thus, input should be introduced along lines, 42. A possible position for this input is shown as 33. Again, capacitors, 37, are inserted in the line so that the voltage with which the line was initialized remains essentially constant during the time switches, 50, are opened and 30 are closed. Obviously other combinations of switches and input locations are possible. However, these configurations should satisfy the condition that the input location is between the switch and the input of any connected active element. In the operation of the circuit of FIG. 2, switches, 50, are closed, initialization is accomplished while switches, 30, are open, and then switches, 50, are opened while switches, 30, are closed.

Fabrication of input lines is accomplished by well-known techniques such as standard CMOS fabrication techniques described in Sze, supra. Similarly, the switches placed in the input data lines which are opened after the system is initialized, are conveniently CMOS T-gates. (See, Weste and Eshraghian, supra.) Structures such as the wires themselves are suitable as capacitors and no addition of extra capacitors is typically necessary.

The following examples are illustrative of the invention.

EXAMPLE 1

A matrix such as shown in FIG. 3 and as encompassed by the dotted phantom rectangle was produced by the procedure described in the Example of co-pending application Ser. No. 004,595 filed Jan. 20, 1987. (Although four inputs are shown, twenty-two were actually present.) However, the dielectric employed in the procedure was a polyimide layer deposited by spin coating. Via holes in this polyimide layer for the interconnecting resistors were produced by reactive ion etching in an oxygen plasma. This etching was performed by the procedure utilized for etching tungsten in sulfurhexafluoride as described in the Example of the abovereferenced application except oxygen was substituted for a sulfurhexafluoride etchant and a 300 voltage plasma bias with a 100 milliTorr gas pressure was employed. The upper level electrode was tungsten and was patterned and deposited as described for the lower level. The overlying amorphous silicon was not hydrogenated. An argon ion beam was employed to ensure that the tungsten exposed through the via hole was uncontaminated before silicon deposition. The overlying amorphous silicon and tungsten layers were deposited onto the polyimide through the via holes and subsequently patterned. The tungsten layers were approximately 0.2 microns in thickness and patterned in accordance with 2 micron lines-and-spaces design rules. The resistors as a result of this fabrication were either 300,000 ohms or were infinite in places where via holes were not produced. The pattern of via holes was chosen using the technique described in J. S. Denker, *Physica*, 22D, 216 (1986).

The chip shown in the phantom rectangle of FIG. 3 was wire bonded to a standard, 44-pin carrier, was mounted on a circuit board, and was interconnected with the remaining portin shown in FIG. 3. This remaining portion was constructed as described in *AIP Conference Proceedings*, "Neural Networks for Computing," Snowbird, Utah (1986), ed. John Denker, American Institute of PHysics, New York (1986), p. 227. The chip used for the amplifiers was a standard chip denominated CD 4069 (National) and the chip used for the switches was a standard chip denominated CD 4066 (National). Chips utilized for multiplexing, computer interfacing, data inputting and data outputting were standard interconnections for a PDP 11 computer. (This interface was built in accordance with the specifications available form Digital Equipment Corporation, Maynard, Mass., the manufacturer of the PDP 11 computer.)

While switch, 20, in FIG. 3 was open the capacitors, 31, representing the capacitance associated with the input of amplifiers, 32, were charged through analog switches (Part No. CD 4066 (National)) corresponding to closed switch, 26, in FIG. 3. The input data corresponding to the charge level of each capacitor, 31, was chosen by the computer with random patterns employed to test the operation of the network. This capacitor charging was not done for all capacitors at once but instead was done for between 14 and 16 capacitors at a time. The corresponding switches, 26 and 20, were then opened after each block was charged until all switches were opened. The computer was programmed then to apply a signal which essentially simultaneously closed all of the switches denominated 20. The network then settled and the obtained output corresponded to the mathematically predicted results.

EXAMPLE 2

A single chip was made including both the active elements and the connection elements. This chip was made utilizing conventional CMOS technology with 2½ micron design rules. Elements connecting to the input of the active element were formed in a silicide level and rows connecting to the output of the active element were formed utilizing an aluminum metallization level.

The active elements were CMOS amplifiers containing standard inverters. The active element included two inverters connected in series. One inverter element was a simple two transistor inverter as described in Weste, supra, and the second element was a clocked inverter as also described in Weste, p. 55. These two elements were connected in series. The interconnection elements are described in "A CMOS Implementation of a Neural Network Model", H. P. Graf et al., *The Proceedings of the Standford Conference on Advanced Research on VLSI*, P. Losleben (ed.) M.I.T. Press (1987), p. 351, and is further shown in FIG. 5 of that paper. The patterns of interconnections and the interconnecting element characteristics are described in Graf et al., supra, as well as in copending U.S. patent application Ser. No. 004,595 Jan. 20, 1987, which is hereby incorporated by reference.

The switches for initialization were arranged as shown in FIG. 2 where amplifiers, 48, corresponded to the previously described active elements and "resistors" 59 corresponded to the interconnection elements. In operation, switches, 30, were open and input switches 50 (shown as a $V_{in}$, FIG. 2) were closed. (Each input $V_{in}$ was connected to a dedicated buffer memory cell 71 which was also part of the chip.) Thus, data could be loaded onto the cell or read from the cell. These cells through multiplexing were loaded with the initializing data. Data are loaded to buffer cell 71 through switch 84 from line 76. (After the circuit settles to an answer, data are read from 71 by closing switch 82 and loading the results on line 73.) The switches, 50, were closed with 30 open and capacitors, 37, were charged. (Capacitors, 37, were, in fact, the capacitors associated with lines, 33 and 32.) Switches, 50, were then opened and switches, 30, were closed. The system then settled to a stable state which corresponded to that mathematically predicted. This determination was made by reading the data through the memory cells by closing switches, 50.

What is claimed is:

1. A process for the parallel processing of signals by a neural network, said neural network comprising (a) a multiplicity of inputs for a matrix with rows and columns connected by interconnected elements and (b) active elements interacting with said matrix, said processes comprising the steps of (1) applying a signal to said multiplicity of inputs wherein switches present in said matrix are located such that each of said inputs is made between a switch in said matrix and the input of one of said active elements and such that, with the switch open, essentially no processing of information occurs, and (2) closing said switches wherein the parallel processing of said applied inputs is initiated.

2. The process of claim 1 wherein said interconnective elements comprise resistors.

3. The process of claim 2 wherein said active element comprises an amplifier.

4. The process of claim 1 wherein said active element comprises an amplifier.

5. A neural network comprising (1) a multiplicity of inputs for a matrix, said matrix with rows and columns connected by interconnective elements and (2) active elements interacting with said matrix

CHARACTERIZED IN THAT a plurality of switches are positioned in said matrix such that each of said inputs is made between one of said switches and the input of one of said active elements and such that when said switches are open said matrix does not process signals applied to said inputs and when said switches are closed parallel processing of said signals is induced.

6. The neural-network of claim 5 wherein said interconnective elements comprises resistors.

7. The neural-network of claim 6 wherein said active element comprises an amplifier.

8. The neural-network of claim 6 wherein a portion of said resistors has infinite resistance.

9. The neural-network of claim 5 wherein said active element comprises an amplifier.

* * * * *

UNITED STATES PATENT AND TRADEMARK OFFICE
CERTIFICATE OF CORRECTION

PATENT NO. : 4,875,183

DATED : October 17, 1989

INVENTOR(S) : H. P. Graf, R. E. Howard

It is certified that error appears in the above-identified patent and that said Letters Patent is hereby corrected as shown below:

```
Column 1, line 12  "Procceedings" should read -- Proceedings--
Column 2, line 7   "conjunctionwith" should read --conjunction with--
Column 2, line 43  "DRAWING" should read --DRAWINGS--
Column 2, line 55  "Wests" should read --Weste-- ,
Column 4, line 6   "abovereferenced" should read --above referenced--
Column 5, line 10  "Standford" should read --Stanford--
Column 5, line 16  insert --filed-- before January
```

Signed and Sealed this

Thirteenth Day of November, 1990

Attest:

HARRY F. MANBECK, JR.

*Attesting Officer*  *Commissioner of Patents and Trademarks*